(No Model.)  2 Sheets—Sheet 1.
J. H. DITTMANN.
APPARATUS FOR MAKING GLASS TOMBSTONES.
No. 548,525.  Patented Oct. 22, 1895.
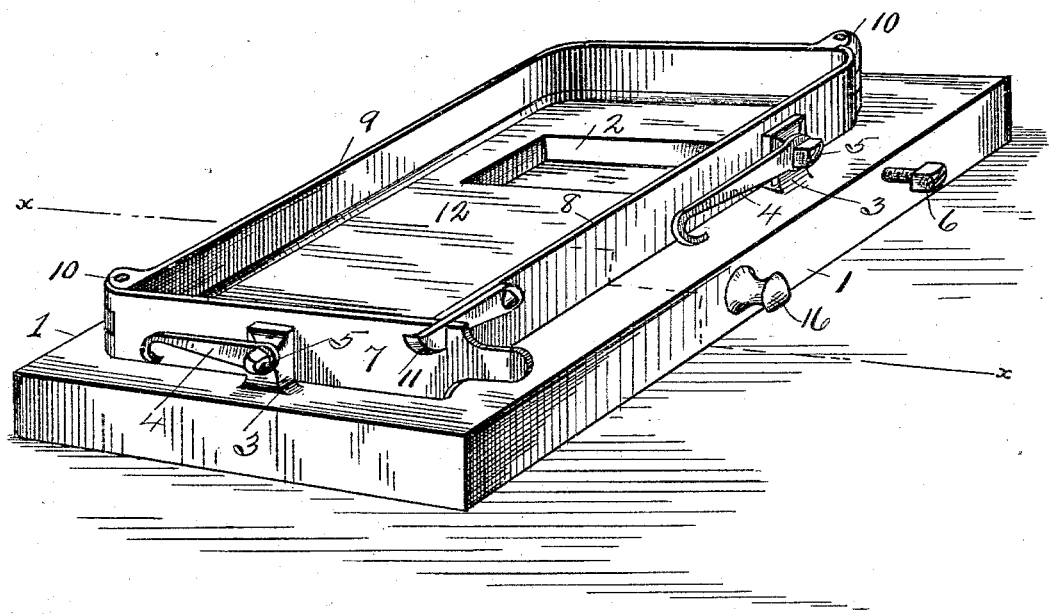
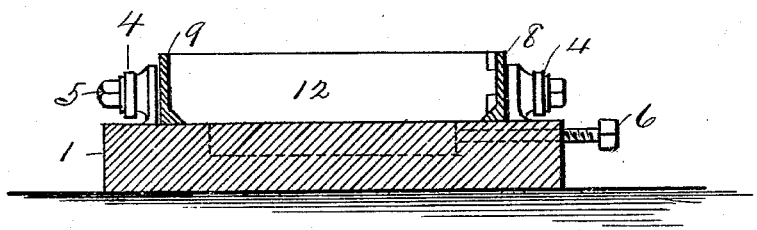

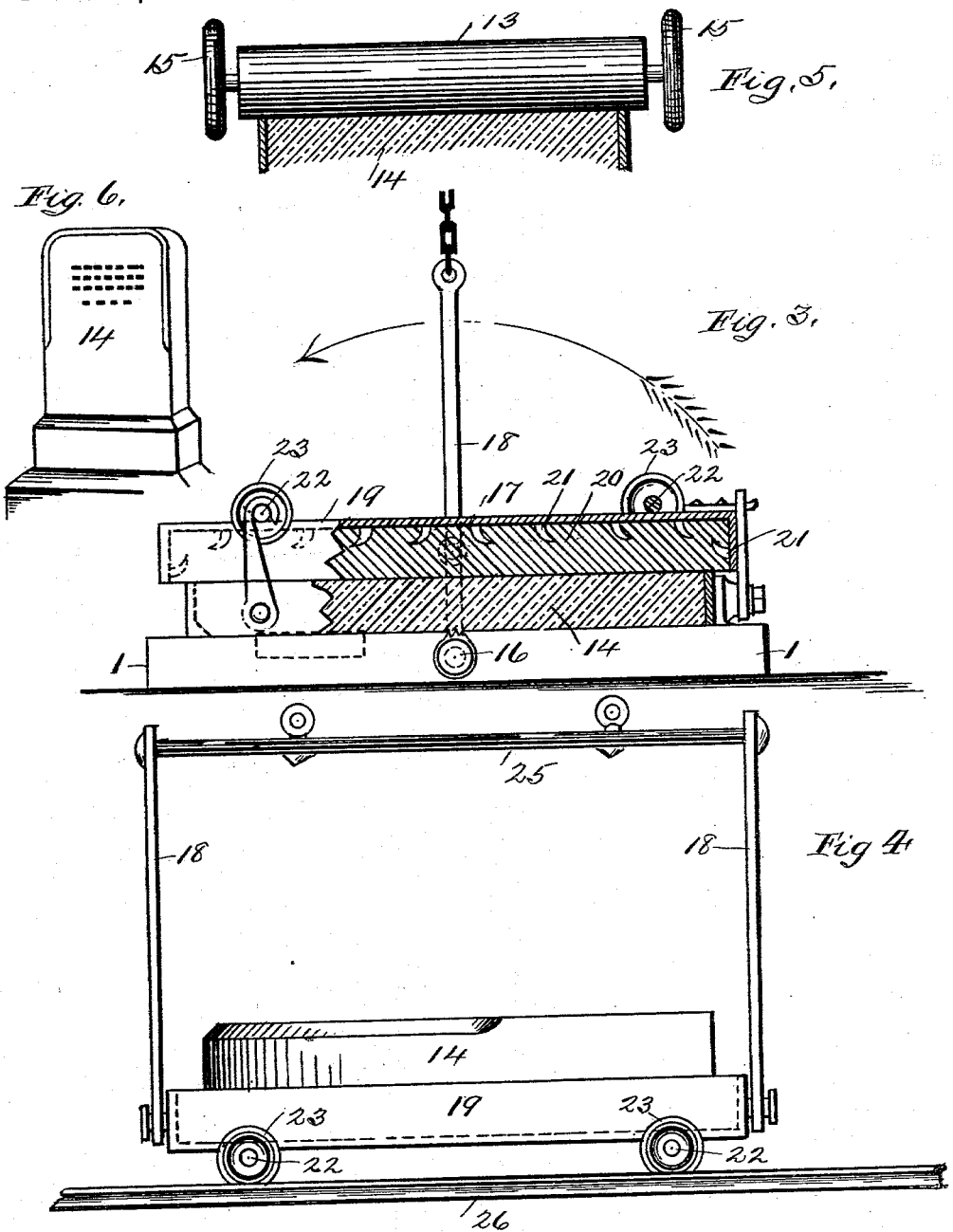

UNITED STATES PATENT OFFICE.

JOSEPH H. DITTMANN, OF FORD CITY, ASSIGNOR OF ONE-HALF TO C. G. L. PEFFER, OF TARENTUM, PENNSYLVANIA.

APPARATUS FOR MAKING GLASS TOMBSTONES.

SPECIFICATION forming part of Letters Patent No. 548,525, dated October 22, 1895.

Application filed February 13, 1895. Serial No. 538,276. (No model.)

*To all whom it may concern:*

Be it known that I, JOSEPH H. DITTMANN, a citizen of the United States, residing at Ford City, in the county of Armstrong and State of Pennsylvania, have invented certain new and useful Improvements in Apparatus for Making Glass Tombstones; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved method and apparatus for manufacturing glass tombstones; and it consists in providing a device whereby glass may be molded into the form of tombstones, monuments, &c., together with the peculiar apparatus used in making the same and the method or process used in the art, as will be fully described hereinafter.

In the accompanying drawings, Figure 1 is a perspective view of a portion of my improved apparatus for manufacturing glass tombstones in accordance with my invention, said view showing the base-plate and flask arranged upon the top of the same. Fig. 2 is a vertical cross-section of the same, said section taken on the line *x x* of Fig. 1. Fig. 3 is a longitudinal elevation, partly in section, of the flask for molding the tombstones, having upon the top of the same the annealing-carriage together with the device for inverting or turning the several parts bottom upward. Fig. 4 is a side elevation of the annealing-carriage having the finished stone upon the top of the same. Fig. 5 is a side elevation of the roller for leveling the top of the glass stone while in a semiliquid condition in the molding-flask. Fig. 6 is a reduced perspective view of a glass tombstone formed in accordance with my improved method.

To construct a glass tombstone in accordance with my improved method, I provide an apparatus consisting of a base-plate 1, formed from cast-iron and having a smooth even top surface. This base-plate 1 is provided with a recess 2, in which a box of type or other ornamental design is placed and the said box held in position by means of a set-screw 6, passed through the side of the base-plate. This base-plate is also provided with several lugs 5, formed integral therewith, each of which is fitted with a hook 4, held in position and pivoted to a bolt 5, the said lugs being for the purpose of centering and holding in position a flask, hereinafter described.

Formed at each side of the base-plate 1 are trunnions 16 to permit the attachment of suitable links 18 for the purpose of reversing, elevating, and transporting the flask and plate from place to place. Arranged upon the top of this base-plate 1 is a molding-flask, consisting of three portions 7, 8, and 9, hinged together at 10 and provided with a latch 11 in a manner that the same may be removed from the finished stone sidewise, and the said flask having a beveled portion at the base to form chamfered corner upon the finished stone, or any other desired ornamentation.

To afford a means of smoothing the glass when in a molten condition within the flask 12, a roller 13 of a suitable weight is provided, having wheels at each side as a means of transporting the same about the factory, said roller 13 being operated back and forward over the molten glass and guided by the top edges of the flask 12 until the glass is smooth and even with the same.

To remove the glass tombstone from the flask 12, I provide a metal box 19, having a series of barbs or projections 21 formed at the sides and base for the purpose of confining therein a plaster bed 20, having a smooth even top. This box 19 is mounted upon wheels 23 and axles 22, by means of which the same may be moved over a railway-track 26 to an annealing-furnace. This box 19 is provided at its sides with trunnions, by means of which suitable links 18 25 may be connected to be elevated and conveyed by a suitable crane or hoist.

In operation the flask is arranged and confined in position upon the base-plate 1, as shown at Fig. 1 on the drawings, and the molten glass poured into the said flask until the same is slightly above the level of the top edges of the said flask. The roller 13 is now used to compress and level the top surface of the glass until even with the top edges of the flask. The plaster-box 19 is now conveyed to the flask 12 and the plaster side inverted and brought against the glass in the mold, as at Fig. 3 on the drawings, and the hook-clamps 4 engaged with the axles 22 and suitably-arranged catches to firmly clamp the flask and plaster-box together. When this has been accomplished, the whole is lifted by means of a suitable hoist and the links 18 and inverted or turned bottom upward, as indicated by the arrow at Fig. 3 on the drawings. After thus inverting the apparatus, as described, the base-plate 1 is removed, (having first released the hooks 4,) the latch 11 is opened, and the flask removed sidewise, thereby parting with any ornamentation formed about the edges of the tombstone. This operation leaves the stone 14 upon the plaster box or carriage 19, and the said carriage and stone conveyed over the track 26 to an annealing lear or furnace, which consists in an ordinary furnace heated to a high temperature and, after the stones are arranged therein, closed and allowed to gradually cool until the temperature is about normal, which occupies several days. After the stones have been thus formed, the same may be ground and polished, if desired, to form a better finish, but may be used as they come from the flask and annealing-furnace.

To provide a suitable inscription upon the face of the stone, a box containing type or other ornamentation, or both, is arranged in the recess 2 of the base-plate 1 and held in position by the set-screw 6, which will leave an impression in the stone 14, either in raised or depressed characters, as desired.

Having thus described my invention, I claim—

1. The herein described apparatus for making tomb-stones, consisting of a base plate provided with trunnions and in combination therewith a link as described, a sectional flask arranged upon the top of the base and means for securing the flask to the base, a carriage and means for securing the base thereto as and for the purpose specified.

2. The herein described apparatus for making glass tombstones, consisting of the base plate provided with trunnions and in combination therewith a link as described, a sectional flask arranged on the base, a box provided with barbs and adapted to contain a bed for the stone, wheels mounted on the box to be turned, to engage the rails, and means for securing the box to the flask as and for the purpose specified.

In testimony whereof I affix my signature in presence of two witnesses.

JOSEPH H. DITTMANN.

Witnesses:
ABE GREENBAUM,
J. T. CRAWFORD.